United States Patent
Nakashima et al.

(10) Patent No.: US 6,930,273 B2
(45) Date of Patent: Aug. 16, 2005

(54) POWER SUPPLY UNIT FOR WIRE ELECTRICAL DISCHARGE MACHINING AND METHOD OF WIRE ELECTRICAL DISCHARGE MACHINING

(75) Inventors: Toshio Nakashima, Tokyo (JP); Kouichirou Hattori, Tokyo (JP); Yoshikazu Ukai, Tokyo (JP); Atsushi Taneda, Tokyo (JP); Akihiro Goto, Tokyo (JP); Takashi Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/297,385

(22) PCT Filed: Jan. 23, 2001

(86) PCT No.: PCT/JP01/00415
§ 371 (c)(1),
(2), (4) Date: Dec. 6, 2002

(87) PCT Pub. No.: WO02/058874
PCT Pub. Date: Aug. 1, 2002

(65) Prior Publication Data
US 2003/0132200 A1 Jul. 17, 2003

(51) Int. Cl.[7] .............................. B23H 1/02; B23H 7/14
(52) U.S. Cl. .................................. 219/69.13; 219/69.18
(58) Field of Search ........................ 219/69.12, 69.13, 219/69.18

(56) References Cited

U.S. PATENT DOCUMENTS

| | | | |
|---|---|---|---|
| 4,277,668 A | | 7/1981 | Inoue |
| 4,350,863 A | * | 9/1982 | Inoue ....................... 219/69.18 |
| 4,447,696 A | * | 5/1984 | Niwa ....................... 219/69.18 |
| 4,453,069 A | | 6/1984 | Inoue |
| 4,798,929 A | | 1/1989 | Itoh |
| 5,064,984 A | | 11/1991 | Yamamoto et al. |
| 5,374,798 A | | 12/1994 | Kinbara |
| 5,475,195 A | * | 12/1995 | Delpretti ................... 219/69.12 |
| 5,585,014 A | | 12/1996 | Magara |
| 5,750,951 A | * | 5/1998 | Kaneko et al. ........... 219/69.18 |

FOREIGN PATENT DOCUMENTS

| | | | | |
|---|---|---|---|---|
| CN | 85 1 04690 A | 12/1986 | | |
| CN | 2174283 Y | 8/1994 | | |
| CN | 1092345 A | 9/1994 | | |
| CN | 2194781 Y | 4/1995 | | |
| CN | 1127485 A | 7/1996 | | |
| CN | 1141606 A | 1/1997 | | |
| CN | 1235077 A | 11/1999 | | |
| JP | 53101195 A | * | 9/1978 | ............. B23P/1/12 |
| JP | S56-15927 A | 2/1981 | | |
| JP | 56015927 A | * | 2/1981 | ............. B23P/1/02 |
| JP | 61-260915 | 11/1986 | | |
| JP | 63260721 A | * | 10/1988 | ............. B23H/1/02 |
| JP | 5-208317 A | 8/1993 | | |
| JP | 7-009258 | 1/1995 | | |
| JP | 7-299658 | 11/1995 | | |
| JP | 8-155744 A | * | 6/1996 | |
| JP | 8-174337 A | 7/1996 | | |
| TW | 371633 | 11/1999 | | |

* cited by examiner

Primary Examiner—Geoffrey S. Evans
(74) Attorney, Agent, or Firm—Sughrue Mion, PLLC

(57) ABSTRACT

A power supply unit for wire electrical discharge machining using an ac high-frequency power supply for applying an ac high-frequency voltage between a wire electrode (1a) and a workpiece (2) includes a high-frequency oscillation and amplification circuit (4) and a pulse power supply (5) which is an ac-high-frequency-voltage intermittently supplying unit for effecting the application of the ac high-frequency voltage between the electrode and the workpiece and a pause thereof. In wire electrical discharge machining using this power supply unit for wire electrical discharge machining, it is possible to suppress the vibration of the wire electrode (1a) due tog the electrostatic force acting between the wire electrode (1a) and the workpiece (2), making it possible to improve the straightness accuracy of a machined surface of the workpiece (2) and make surface roughness small.

12 Claims, 7 Drawing Sheets

STRAIGHTNESS ACCURACY: 2.39μm
VERTICAL SURFACE ROUGHNESS: 1.29μmRmax
HORIZONTAL SURFACE ROUGHNESS: 1.82μmRmax STRAIGHTNESS ACCURACY: 0.19μm
VERTICAL SURFACE ROUGHNESS: 1.22μmRmax
HORIZONTAL SURFACE ROUGHNESS: 1.49μmRmax

POWER SUPPLY UNIT FOR WIRE ELECTRICAL DISCHARGE MACHINING AND METHOD OF WIRE ELECTRICAL DISCHARGE MACHINING

TECHNICAL FIELD

The present invention relates to improvements in a power supply unit for wire electrical discharge machining and a method of wire electrical discharge machining which are used in wire electrical discharge machining for machining a workpiece by generating electric discharge in an electrode gap between a wire electrode and the workpiece to supply machining electric power to the electrode gap.

BACKGROUND ART

As a conventional power supply unit for wire electrical discharge machining for supplying machining electric power between an electrode and a workpiece, it is known that a fine machined surface can be obtained in the workpiece by applying an ac high-frequency voltage between the electrode and the workpiece and generating electric discharge of short time durations at a high frequency of repetition. For example, it is disclosed in JP-A-61-260915 that a machined surface of 1 µm Rmax or less can be obtained by applying an ac high-frequency voltage of 1 MHz to 5 MHz between the electrode and the workpiece. In addition, it is disclosed in JP-A-7-9258 that a machined surface of 0.5 µm Rmax or less can be obtained by applying an ac high-frequency voltage of 7 MHz to 30 MHz between the electrode and the workpiece.

FIG. 10 is a block diagram illustrating an example of a conventional power supply unit for electrical discharge machining using an ac high-frequency power supply. In the drawing, reference numeral 1 denotes an electrode; 2, a workpiece; 3, a dc power supply; and 4, a high-frequency oscillation and amplification circuit. A fixed voltage or electric power is inputted to the high-frequency oscillation and amplification circuit 4 from the dc power supply 3 through an external command, which in turn generates an ac high-frequency voltage, and by applying the ac high-frequency voltage Vg between the electrode 1 and the work piece 2, thereby effecting electrical discharge machining of the workpiece 2 by electric discharge energy.

FIG. 11 is a diagram illustrating an example of a bath voltage waveform at the time of no-load in a case where an ac high-frequency voltage is applied between the electrode and the workpiece in the conventional power supply unit for electrical discharge machining using the ac high-frequency power supply. By continuously supplying the ac high-frequency voltage between the electrode and the workpiece at a frequency of, e.g., 1 MHz or higher, it is possible to obtain a machined surface whose surface roughness is very smooth.

The above-described conventional power supply unit for electrical discharge machining using the ac high-frequency power supply has a large advantage in that the surface roughness of the machined surface of the workpiece becomes very smooth. However, it has become known that in a case where this power supply unit for electrical discharge machining is used in wire electrical discharge machining, there are a number of problems in order to meet exacting requirements in the recent market. The problems of the power supply unit for wire electrical discharge machining using the ac high-frequency power supply are shown below.

(1) Straightness Accuracy Declines.

With the power supply unit for wire electrical discharge machining using the ac high-frequency power supply, since the voltage remains applied between the electrode and the workpiece, an attracting force based on electrostatic force acts between the wire electrode and the workpiece, so that a so-called "barrel shape" is formed in which a central portion of the workpiece is machined by a greater degree. Hence, there is a problem in that the straightness accuracy declines.

(2) Streaks Occur in the Machined Surface.

Since the wire electrical discharge machining using the ac high-frequency power supply is the machining of an area where the surface roughness is fine, even if there is the slightest vibration of the wire electrode, its effect imparted to the quality of the machined surface becomes noticeable. Accordingly, there is a problem in that streaks occur on the machined surface of the workpiece due to the vibration of the wire electrode occurring since the reaction force based on the electric discharge and the attracting force based on the electrostatic force acting between the wire electrode and the workpiece are not fixed. In addition, such streaks on the machined surface can be confirmed by visual observation as well.

As for the machined surface of the workpiece based on the power supply unit for wire electrical discharge machining using the ac high-frequency power supply, it is not rare that a large difference occurs between the surface roughness in the vertical direction (direction parallel to the wire electrode during machining) and the surface roughness in the horizontal direction (direction perpendicular to the wire electrode during machining). For example, there are cases where the surface roughness in the horizontal direction is aggravated by 30 to 40 percent or thereabouts in comparison with the surface roughness in the vertical direction. FIGS. 12A and 12B shows an example of the surface roughness of the machined surface of the workpiece in a case where a 20 mm-thick steel is machined with a 0.2 mm-diameter brass wire electrode by means of the conventional power supply unit for wire electrical discharge machining using the ac high-frequency power supply. FIG. 12A shows the curve of surface roughness in the vertical direction, while FIG. 12B shows the curve of surface roughness in the horizontal direction. In the case of FIGS. 12A and 12B, the surface roughness in the horizontal direction is 1.82 µm Rmax, and the surface roughness in the vertical direction is 1.29 µm Rmax, so that it can be seen that the surface roughness in the horizontal direction is about 40% coarser than the surface roughness in the vertical direction. The difference in surface roughness based on the direction is related to the streaks occurring on the machined surface of the workpiece.

(3) The Machined Surface Roughness Declines.

With the power supply unit for wire electrical discharge machining using the ac high-frequency power supply, although the polarity of the voltage alternates, the voltage constantly remains applied, so that a phenomenon is noted in which the discharge continues for a long cycle (corresponding to several cycles to several dozen cycles). Hence, there is a problem in that only the surface roughness which is several times coarser than the surface roughness supposed to be obtained by the discharge of one pulse (half wave of an alternating current) of an ac high frequency can be obtained. FIG. 13 shows an example of a bath voltage waveform at the time of the execution of machining by the conventional power supply unit for electrical discharge machining using the ac high-frequency power supply with a power supply frequency of 13.55 MHz. The presence or absence of the discharge can be primarily determined since the peak value of the ac high-frequency applied voltage drops to a predetermined voltage or below. From the voltage waveform shown in FIG. 13, the phenomenon is observed in which the discharge takes place continuously over several dozen cycles of the ac high-frequency applied voltage. In rough machining, it is known that when the phenomenon in which the discharge occurs immediately after the application of the voltage has taken place, the discharge frequently occurs in the same location. Also in electrical discharge machining based on the power supply unit for wire electrical discharge machining using the ac high-frequency power supply such as the one shown in FIG. 13, it is estimated that discharge concentrations occur, and it is conceivable that the machined surface roughness declines due to the discharge concentrations.

As applications of wire electrical discharge machining, applications for which extremely high precision and very smooth surface roughness are required are increasing in the semiconductor industry and other industries. For example, in the machining of such as dies for IC leadframes, there are such exacting requirements as the shape accuracy being 1 $\mu$m or less and the surface roughness being 0.5 $\mu$m Rmax. To meet such exacting requirements, it has been a pressing task to overcome the above-described problems.

DISCLOSURE OF THE INVENTION

The present invention has been devised to overcome the above-described problem, and its object is to obtain a power supply unit for wire electrical discharge machining and a method of wire electrical discharge machining which make it possible to obtain a high-precision and high-quality machined surface of the workpiece.

The power supply unit for wire electrical discharge machining in accordance with the invention is a power supply unit for wire electrical discharge machining using an ac high-frequency power supply for applying an ac high-frequency voltage between a wire electrode and a workpiece, characterized by comprising: ac-high-frequency-voltage intermittently supplying means which effects the application of the ac high-frequency voltage between the wire electrode and the workpiece and a pause thereof.

In addition, in the power supply unit for wire electrical discharge machining in accordance with the invention, a time of application of the ac high-frequency voltage by the ac-high-frequency-voltage intermittently supplying means is set to a predetermined time which is capable of interrupting the continuation of discharge.

In addition, in the power supply unit for wire electrical discharge machining in accordance with the invention, a time of application of the ac high-frequency voltage by the ac-high-frequency-voltage intermittently supplying means is set to approximately 1 $\mu$s or less.

In addition, in the power supply unit for wire electrical discharge machining in accordance with the invention, a time of application of the ac high-frequency voltage by the ac-high-frequency-voltage intermittently supplying means is set to not more than about 10 cycles of the ac high-frequency voltage.

In addition, the power supply unit for wire electrical discharge machining in accordance with the invention comprises: controlling means in which a time of application of the ac high-frequency voltage by the ac-high-frequency-voltage intermittently supplying means and a pause time thereof as well as machining characteristics based on a peak value and a frequency of the ac high-frequency voltage and the like are stored in advance, and stored values of the time of application of the ac high-frequency voltage and the pause time are invoked in accordance with required specifications and machining conditions so as to control the ac-high-frequency-voltage intermittently supplying means.

In addition, the power supply unit for wire electrical discharge machining in accordance with the invention comprises: ac-high-frequency-voltage variably supplying means which supplies the power to the electrode gap by making smaller at a predetermined ratio an absolute value of the ac high-frequency voltage in a second predetermined time than an absolute value of the ac high-frequency voltage in a first predetermined time, and which effects such variable voltage supply repeatedly.

In addition, in the power supply unit for wire electrical discharge machining in accordance with the invention, the first time of application of the ac high-frequency voltage by the ac-high-frequency-voltage variably supplying means is set to a predetermined time which is capable of interrupting the continuation of discharge.

In addition, in the power supply unit for wire electrical discharge machining in accordance with the invention, the first time of application of the ac high-frequency voltage by the ac-high-frequency-voltage variably supplying means is set to approximately 1 $\mu$s or less.

In addition, in the power supply unit for wire electrical discharge machining in accordance with the invention, the first time of application of the ac high-frequency voltage by the ac-high-frequency-voltage variably supplying means is set to not more than about 10 cycles of the ac high-frequency voltage.

In addition, the power supply unit for wire electrical discharge machining in accordance with the invention comprises: controlling means in which the first predetermined time and the second predetermined time as well as machining characteristics based on a peak value and a frequency of the ac high-frequency voltage and the like are stored in advance, and stored values of the first predetermined time and the second predetermined time are invoked in accordance with required specifications and machining conditions so as to control the ac-high-frequency-voltage variably supplying means.

In addition, the method of wire electrical discharge machining in accordance with the invention is a method of wire electrical discharge machining for machining a workpiece by supplying an ac high-frequency voltage between a wire electrode and the workpiece, characterized in that the application of the ac high-frequency voltage between the wire electrode and the workpiece is effected intermittently.

In addition, in the method of wire electrical discharge machining in accordance with the invention, a time of application of the ac high-frequency voltage and a pause time thereof are made variable in accordance with required specifications and machining conditions.

In addition, the method of wire electrical discharge machining in accordance with the invention is a method of wire electrical discharge machining for machining a workpiece by supplying an ac high-frequency voltage between a wire electrode and the workpiece, characterized in that the ac high-frequency voltage is applied between the wire electrode and the workpiece by making smaller at a predetermined ratio an absolute value of the ac high-frequency voltage in a second predetermined time than an absolute value of the ac high-frequency voltage in a first predetermined time, and such variable voltage supply is effected repeatedly.

In addition, in the method of wire electrical discharge machining in accordance with the invention, the first predetermined time and the second predetermined time are made variable in accordance with required specifications and machining conditions.

Since the power supply unit for wire electrical discharge machining and the method of wire electrical discharge machining in accordance with the invention are arranged as described above, it is possible to improve the straightness accuracy of the machined surface of the workpiece. In addition, it is possible to eliminate streaks formed on the machined surface of the workpiece. Further, it is possible to make the surface roughness of the machined surface of the workpiece small. Furthermore, it is possible to control the decline in machining productivity while securing the desired shape accuracy and surface roughness of the workpiece.

BEST MODE FOR CARRYING OUT THE INVENTION

First Embodiment

Figure 1:
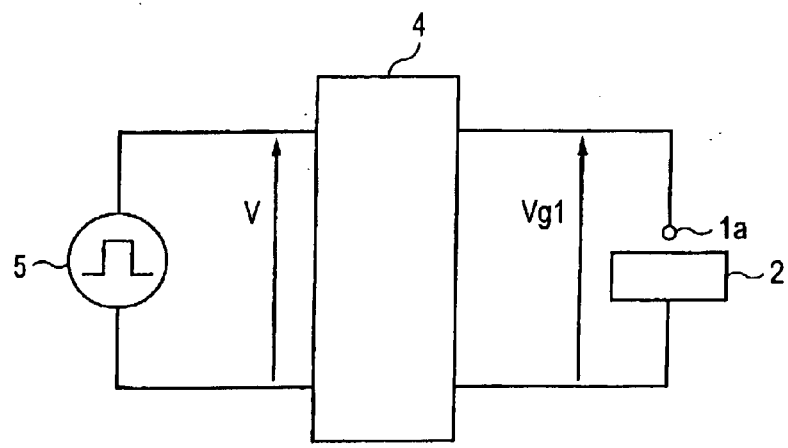
FIG. 1 is a block diagram of the power supply unit for wire electrical discharge machining in accordance with a first embodiment of the invention.

FIG. 1 is a block diagram of the power supply unit for wire electrical discharge machining in accordance with a first embodiment of the invention. In the drawing, reference numeral 1a denotes a wire electrode; 2, a workpiece; 4, a high-frequency oscillation and amplification circuit; and 5, a pulse power supply. As an intermittent voltage V is inputted from the pulse power supply 5 to the high-frequency oscillation and amplification circuit 4, an ac high-frequency voltage with a voltage Vg1 is applied between the wire electrode 1a and the workpiece 2.

Figure 2A:
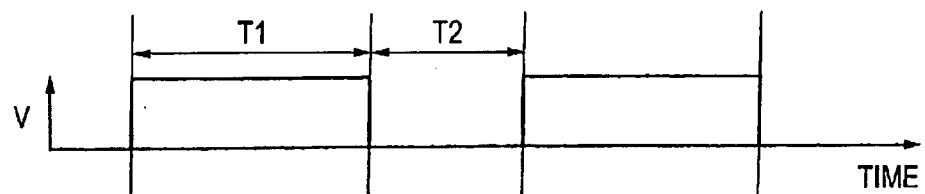
FIGS. 2A and 2B are conceptual diagrams for explaining the voltage waveform of a pulse power supply and a bath voltage waveform in the power supply unit for wire electrical discharge machining in accordance with the first embodiment of the invention.
Figure 2B:
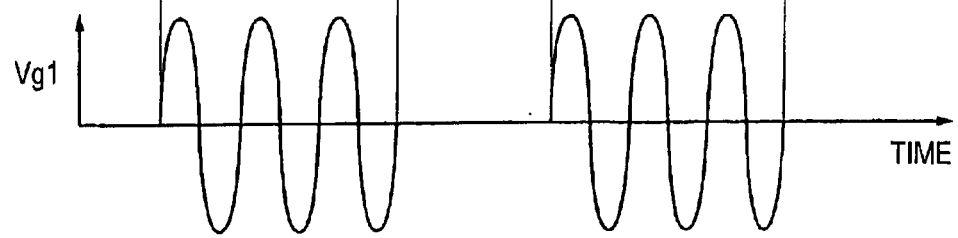

FIGS. 2A and 2B are conceptual diagrams for explaining the voltage waveform V of the pulse power supply 5 and the bath voltage waveform Vg1 in the power supply unit for wire electrical discharge machining in accordance with the first embodiment of the invention. An ac high-frequency voltage is applied intermittently between the electrode and the workpiece in synchronism with a predetermined time T1 during which a pulse voltage V outputted from the pulse power supply 5 is applied and a predetermined time T2 during which the pulse power supply 5 is not applied.

The pulse power supply 5 corresponds to an ac-high-frequency-voltage intermittently supplying means which effects the application of the ac high-frequency voltage between the electrode and the workpiece (predetermined time T1) and a pause (predetermined time T2) thereof.

Figure 3:
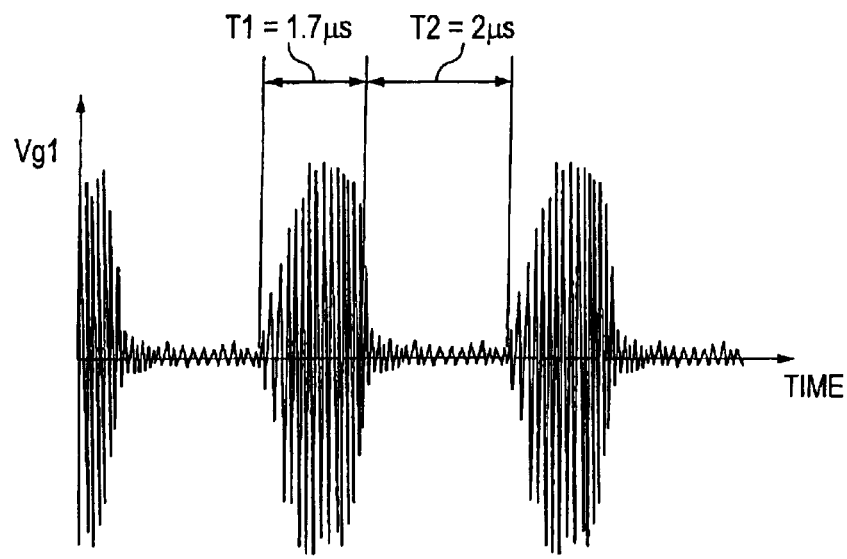
FIG. 3 is a diagram illustrating an example of the bath voltage waveform in a case where an intermittent ac high-frequency voltage is applied by the power supply unit for wire electrical discharge machining in accordance with the first embodiment of the invention.

FIG. 3 shows an example of the bath voltage waveform Vg1 in a case where the ac high-frequency voltage with a frequency of 13.55 MHz is intermittently applied with the predetermined time T1=1.7 $\mu$s and the predetermined time T2=2 $\mu$s. The fact that the amplitude of the bath voltage waveform Vg1 is not fixed as compared with the conceptual diagram shown in FIG. 2A and 2B is due to such as the effect of time constants of the rise and fall.

By applying the ac high-frequency voltage intermittently in the above-described manner, the electrostatic force occurring in the electrode gap during the predetermined time T2 when the ac high-frequency voltage is not applied can be reduced, so that it becomes possible to suppress the vibration of the wire electrode 1a, thereby making it possible to realize high-precision machining.

Figure 4A:
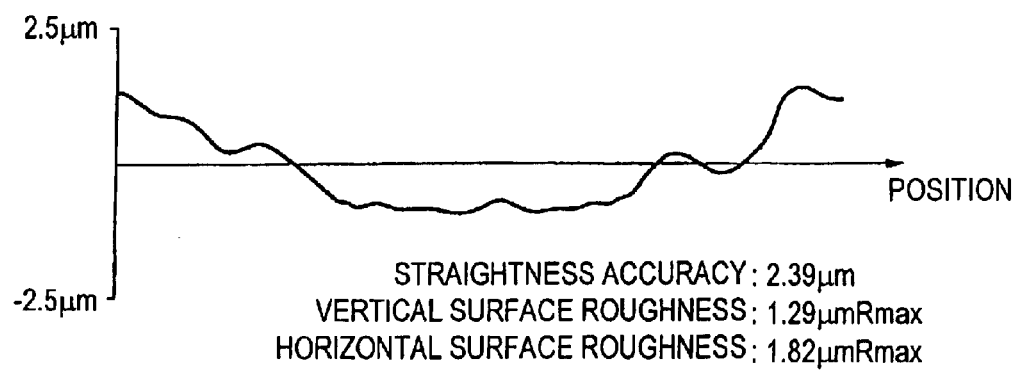
FIGS. 4A and 4B are diagrams illustrating the results of measurement of the shape curve, straightness accuracy, and surface roughness of a machined surface of the workpiece.
Figure 4B:
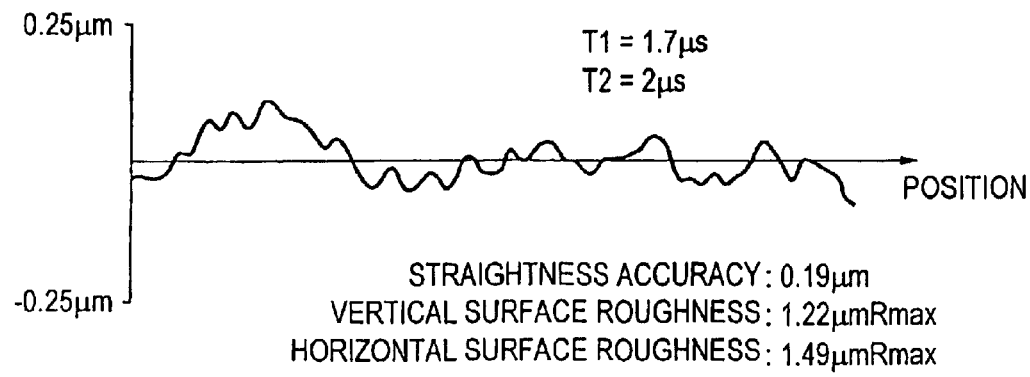

FIGS. 4A and 4B show the results of measurement of the shape curve, straightness accuracy, and surface roughness of the machined surface of the workpiece. FIG. 4A shows the shape curve and the like in a case where a 13.55 MHz ac high-frequency voltage was applied continuously, while FIG. 4B shows the shape curve and the like in a case (T1=1.7 $\mu$s, T2=2 $\mu$s) where the 13.55 MHz ac high-frequency voltage was applied intermittently. In addition, both of FIGS. 4A and 4B show the results of measurement in a case where the workpiece was a 20 mm-thick steel and the wire electrode was 0.2 mm-diameter brass.

Looking at the shape curve in the case where the ac high-frequency voltage was applied continuously in FIG. 4A, the so-called "barrel shape" was formed in which the central portion of the workpiece was substantially concaved, and the straightness accuracy was 2.39 $\mu$m and was poor; however, the straightness accuracy in the case where the ac high-frequency voltage was applied intermittently in FIG. 4B was 0.19 $\mu$m. Thus it was possible to confirm that the straightness accuracy can be substantially improved by the intermittent application of the ac high-frequency voltage.

In addition, it was found that in the case where the ac high-frequency voltage was applied intermittently in FIG. 4B, as compared with the case where the ac high-frequency voltage was applied continuously in FIG. 4A, the difference between the surface roughness in the horizontal direction and the surface roughness in the vertical direction of the machined surface of the workpiece was small. Also, it was confirmed that in the case where the ac high-frequency voltage was applied intermittently in FIG. 4B, streaks on the machined surface of the workpiece occurring due to the vibration of the wire electrode disappear.

However, it can be understood that the surface roughness of the machined surface of the workpiece cannot be improved substantially under the condition of intermittent application of the ac high-frequency voltage.

This is conceivably attributable to the fact that since the predetermined time T1 of application of the ac high-frequency voltage is long, the intermittent application of the ac high-frequency voltage is not much different from the continuous application of the ac high-frequency voltage in terms of the continuation of the discharge. Accordingly, when discharges were effected by making short the predetermined time T1 of application of the ac high-frequency voltage to interrupt the continuation of the discharge by the ac high frequency, it was found that the surface roughness of the machined surface of the workpiece can be made very small if the predetermined time T1 of application of the ac high-frequency voltage is set to not more than a predetermined value.

Figure 5:
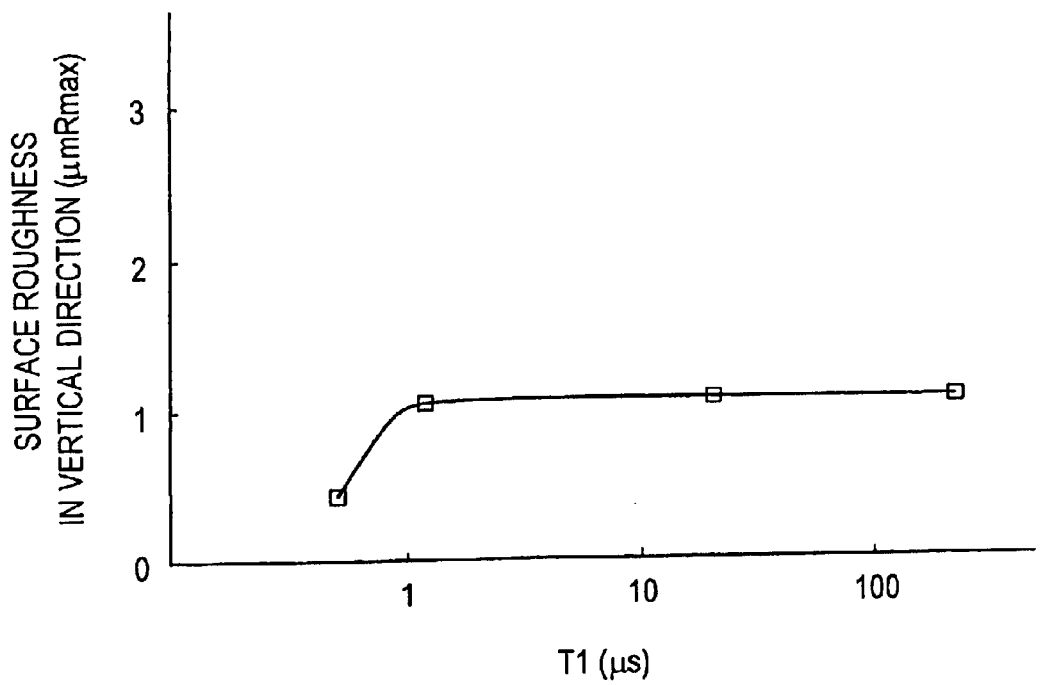
FIG. 5 is a diagram illustrating the change of the surface roughness in the vertical direction of the machined surface of the workpiece based on a predetermined time T1 of application of the ac high-frequency voltage.

FIG. 5 shows the change of the surface roughness in the vertical direction of the machined surface of the workpiece based on the predetermined time T1 of application of the ac high-frequency voltage, and reveals that the surface roughness of the machined surface of the workpiece becomes very small and high-quality surface qualities can be obtained if the predetermined time T1 of application of the ac high-frequency voltage is set to not more than approximately 1 $\mu$s or thereabouts (corresponding to about 10 to 10 odd cycles of the ac high-frequency voltage). For example, in the case where the predetermined time T1 of application of the ac high-frequency voltage was 0.6 $\mu$s, the surface roughness in the vertical direction of the machined surface of the workpiece was 0.76 $\mu$m Rmax (the surface roughness in the horizontal direction: 0.89 $\mu$m Rmax), so that it can be understood that the surface roughness can be improved substantially in comparison with the results of measurement of the surface roughness of the machined surface of the workpiece shown in FIGS. 4A and 4B.

As described above, although it was found that the machining characteristics such as the straightness accuracy, the surface roughness, and the like of the workpiece can be improved substantially by the intermittent application of the ac high-frequency voltage and selecting the predetermined time T1 of application of the ac high-frequency voltage, the machining efficiency declines in comparison with the case of the continuous application of the ac high-frequency voltage. Accordingly, if the machining characteristics based on the predetermined times T1 and T2 as well as the peak value and the frequency of the ac high-frequency voltage and the like are determined in advance by experiments and are stored in an unillustrated controlling means, and if the predetermined times T1 and T2 are set by the controlling means in accordance with required specifications and machining conditions, it is possible to control the decline in machining productivity while securing the desired shape accuracy and surface roughness.

For example, if the thickness of the workpiece becomes large, the effect due to the electrostatic force becomes large, so that if the electrostatic force is made small by lowering the proportion of the predetermined time T1 by enlarging the predetermined time T2, it is possible to improve the straightness accuracy. Meanwhile, in a case where the amount of machining becomes large, by making the predetermined time T1 large by making the predetermined time T2 small, it is possible to realize stable machining by increasing the machining capability.

To apply the above-described ac high-frequency voltage between the electrode and the workpiece, there are various methods in addition to the use of the pulse power supply 5, such as the one shown in FIG. 1, as the ac-high-frequency-voltage intermittently supplying means. For example, a dc power supply may be used instead of the pulse power supply 5, and the voltage supplied to the high-frequency oscillation and amplification circuit 4 may be turned on and off by a switching device, or an arrangement may be provided such that a continuous ac high-frequency voltage is generated beforehand as the power supply, and the electrode gap is forcibly shortcircuited periodically.

In addition, the invention disclosed in, for example, JP-A-59-232726 is known as being related to the above-described concept of interposing pauses in the ac high-frequency power supply. In that invention, there are provided a first power supply for applying an ac high-frequency voltage and a second power supply for allowing a pulse current of a predetermined width to flow from the point of time of starting the discharge, and electrical discharge machining is effected by the pulse current when a discharge has occurred on application of the ac high-frequency voltage between the electrode and the workpiece, and that invention concerns a power supply of a type in which the ac high-frequency voltage is used to induce the discharge, and a dc current is applied after detecting the discharge. Accordingly, the machining speed and the electrode wear are determined by the aforementioned pulse current, and the technical concept utterly differs from the present invention.

Second Embodiment

Figure 6:
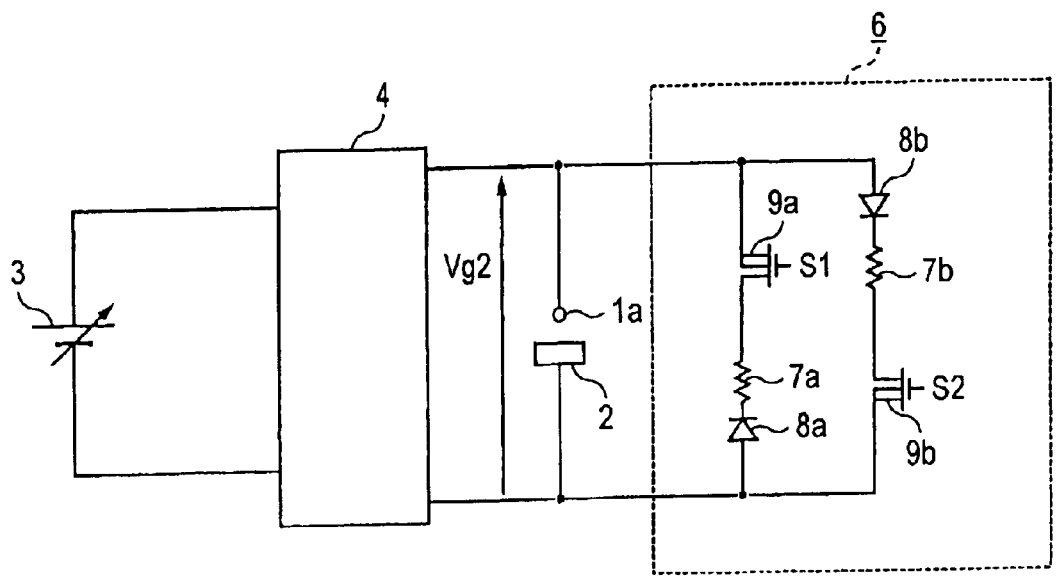
FIG. 6 is a circuit diagram of a power supply unit for wire electrical discharge machining in accordance with a second embodiment of the invention.

FIG. 6 is a circuit diagram of a power supply unit for wire electrical discharge machining in accordance with a second embodiment of the invention. In the drawing, reference numeral 1a denotes the wire electrode; 2, the workpiece; 3, a dc power supply; 4, the high-frequency oscillation and amplification circuit; and 6, a resistance device. Numerals 7a and 7b denote resistors; 8a and 8b, diodes; and 9a and 9b, FETs. As a predetermined voltage is inputted from the dc power supply 3 to the high-frequency oscillation and amplification circuit 4, an ac high-frequency voltage with a voltage Vg2 is applied between the wire electrode 1a and the workpiece 2. The FETs 9a and 9b in the resistance device 6 connected in parallel to the electrode gap are arranged to be capable of being independently driven by external signals S1 and S2. In addition, the diode 8a is connected in series to the resistor 7a in a direction in which the current flows when the polarity of the wire electrode 1a is minus and the polarity of the workpiece 2 is plus (straight polarity), whereas the diode 8b is connected in series to the resistor 7b in a direction in which the current flows when the polarity of the wire electrode 1a is plus and the polarity of the workpiece 2 is minus (reverse polarity)

Figure 7A:
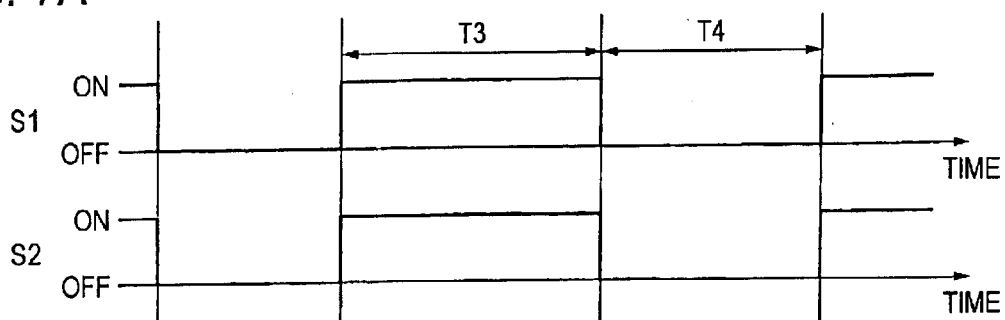
FIGS. 7A and 7B are conceptual diagrams for explaining input signals FETs and a bath voltage waveform in the power supply unit for wire electrical discharge machining in accordance with the second embodiment of the invention.
Figure 7B:
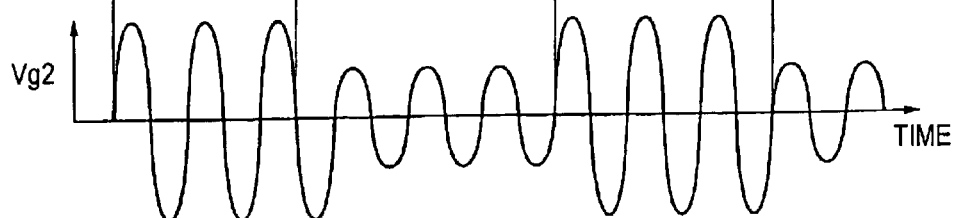

FIGS. 7A and 7B are conceptual diagrams for explaining the respective input signals S1 and S2 of the FET 9a and the FET 9b and a bath voltage waveform Vg2 in the power supply unit for wire electrical discharge machining in accordance with the second embodiment of the invention. In a case where the on and off operation of the FET 9a and the FET 9b is effected in synchronism as in FIG. 7A, the absolute value of the ac high-frequency voltage Vg2 applied between the electrode and the workpiece becomes smaller in the case of a predetermined time T3 (a second predetermined time) when the external signals S1 and S2 are on than in the case of a predetermined time T4 (a first predetermined time) when the external signals S1 and S2 are off, as shown in FIG. 7B.

The resistance device 6 in FIG. 6 corresponds to an ac-high-frequency-voltage variably supplying means which effects the supply to the electrode gap by making smaller at a predetermined ratio the absolute value of the ac high-frequency voltage for the second predetermined time than for the first predetermined time, and which effects such variable voltage supply repeatedly.

By applying such an ac high-frequency voltage between the electrode and the workpiece, it is possible to reduce the electrostatic force occurring between the wire electrode 1a and the workpiece 2 during the predetermined time T3, so that it becomes possible to suppress the vibration of the wire electrode 1a and realize machining with greater precision.

Third Embodiment

Figure 8:
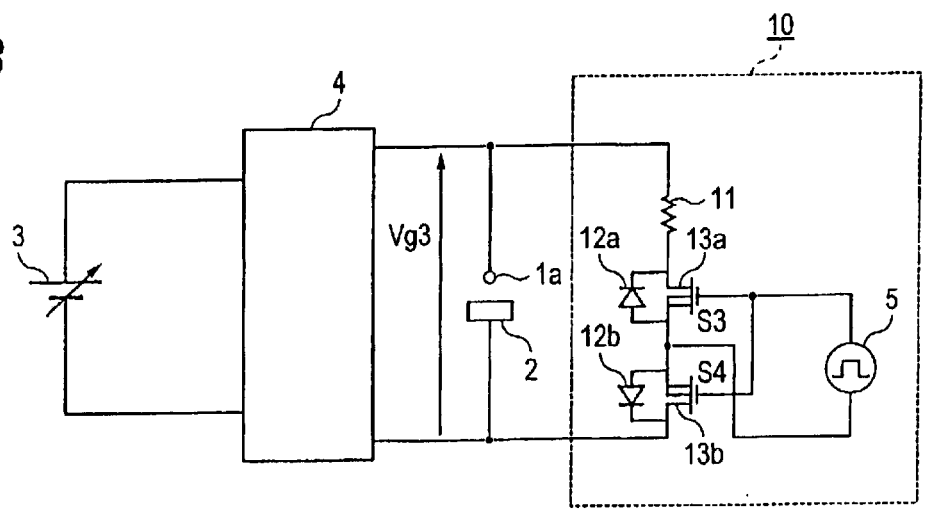
FIG. 8 is a circuit diagram of the power supply unit for wire electrical discharge machining in accordance with a third embodiment of the invention.

FIG. 8 is a circuit diagram of the power supply unit for wire electrical discharge machining in accordance with a third embodiment of the invention, and the same reference numerals as those in FIG. 6 in accordance with the second embodiment denote identical or corresponding portions. In FIG. 8, reference numeral 5 denotes the pulse power supply; 10, a resistance device; 11, a resistor. Numerals 12a and 12b denote diodes; and 13a and 13b, FETs. As a predetermined voltage is inputted from the dc power supply 3 to the high-frequency oscillation and amplification circuit 4, an ac high-frequency voltage Vg3 is applied between the wire electrode 1a and the workpiece 2. The FETs 13a and 13b in the resistance device 10 connected in parallel to the electrode gap are arranged to be capable of being simultaneously driven by the pulse power supply 5. At the time of the reverse polarity, the current flows across the resistor 11 through the FET 13a and the diode 12b of the FET 13b, while at the time of the straight polarity, the current flows across the resistor 11 through the diode 12a of the FET 13a and the FET 13b.

Figure 9A:
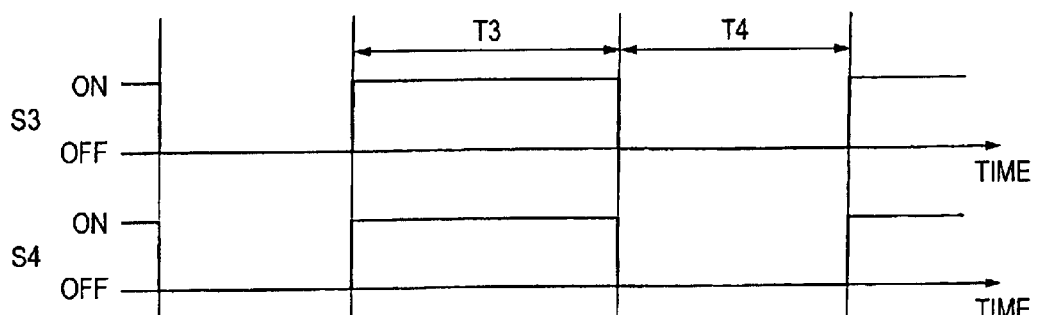
FIGS. 9A and 9B are conceptual diagrams for explaining the input signals FETs and the bath voltage waveform in the power supply unit for wire electrical discharge machining in accordance with the third embodiment of the invention.
Figure 9B:
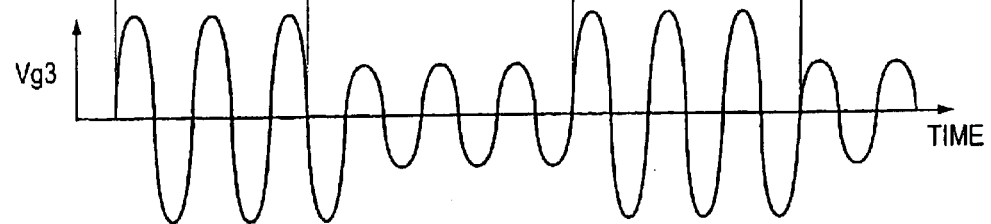
Figure 10:
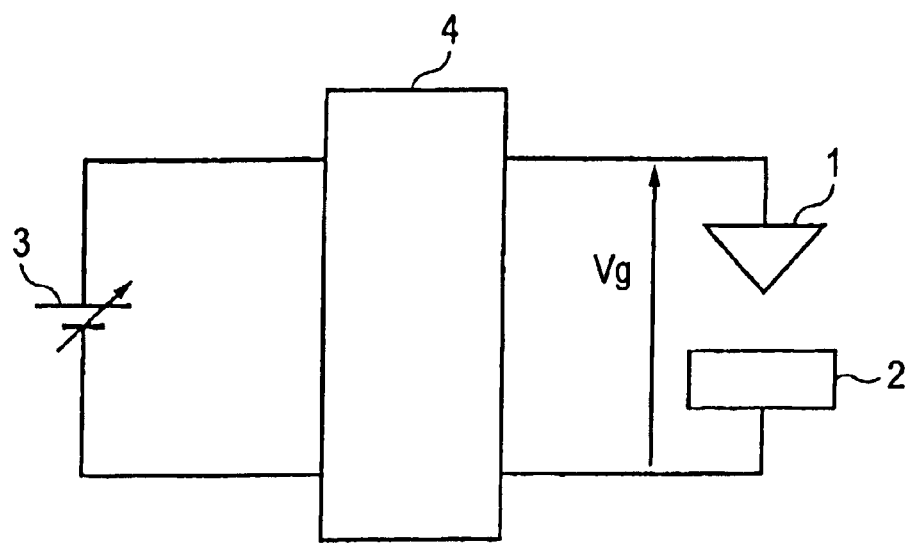
FIG. 10 is a block diagram illustrating an example of a conventional power supply unit for electrical discharge machining.
Figure 11:
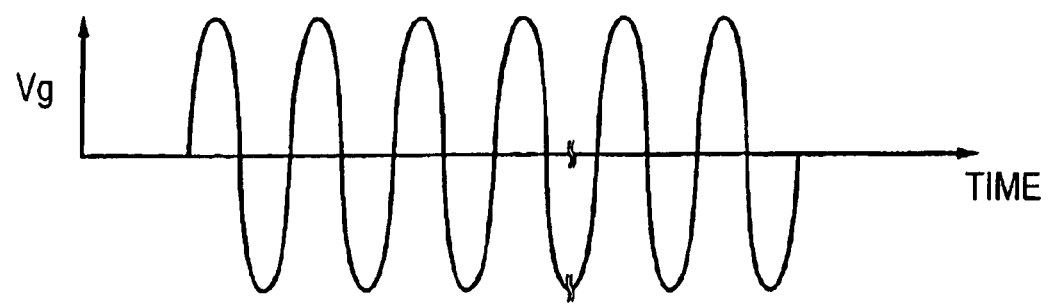
FIG. 11 is a diagram illustrating an example of a no-load voltage waveform at a time when an ac high-frequency voltage is applied between the electrode and the workpiece in the conventional power supply unit for electrical discharge machining using the ac high-frequency power supply.
Figure 12A:
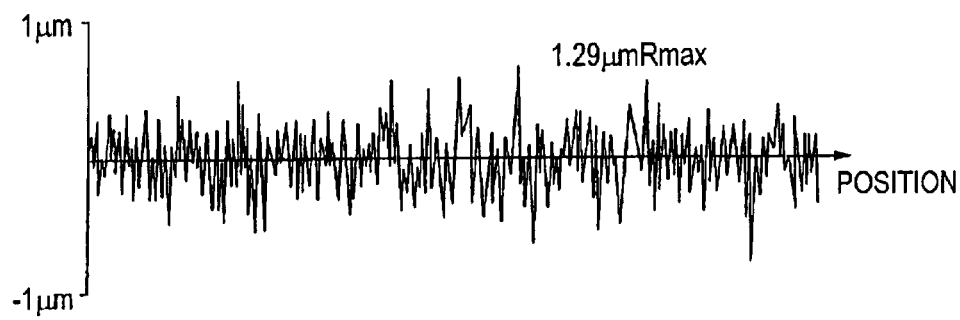
FIGS. 12A and 12B are diagrams illustrating an example of the surface roughness of the machined surface of the workpiece in the conventional power supply unit for electrical discharge machining using the ac high-frequency power supply.
Figure 12B:
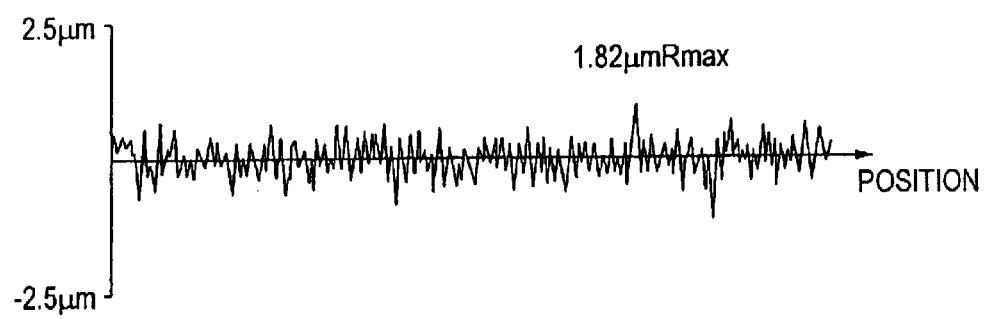
Figure 13:
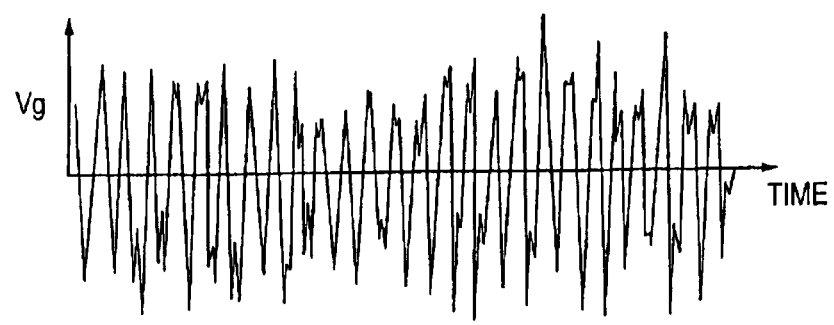
FIG. 13 is a diagram illustrating an example of a bath voltage waveform at the time of the execution of machining by the conventional power supply unit for electrical discharge machining using the ac high-frequency power supply.

FIGS. 9A and 9B are conceptual diagrams for explaining respective input signals S3 and S4 of the FET 13a and the FET 13b and the bath voltage waveform Vg3 in the power supply unit for wire electrical discharge machining in accordance with the third embodiment of the invention. As the FET 13a and the FET 13b are turned on and off in synchronism as in FIG. 9A, as shown in FIG. 9B, it is possible to obtain a bath voltage waveform similar to that in FIG. 7B in accordance with the second embodiment, and an advantage similar to that of the second embodiment is offered.

In addition, in this case, the resistance device 10 in FIG. 8 corresponds to the ac-high-frequency-voltage variably supplying means which effects the supply to the electrode gap by making smaller at a predetermined ratio the absolute value of the ac high-frequency voltage for the second predetermined time than for the first predetermined time, and which effects such variable voltage supply repeatedly.

INDUSTRIAL APPLICABILITY

As described above, the power supply unit for wire electrical discharge machining and the method of wire electrical discharge machining in accordance with the invention are particularly suitable for use in high-precision and high-quality wire electrical discharge machining.

What is claimed is:

1. A power supply unit for wire electrical discharge machining comprising an ac high-frequency power supply operable to intermittently supply an ac high-frequency voltage between a wire electrode and a workpiece to machine the workpiece,
   wherein a period of time during which the ac high-frequency voltage is applied by said ac high-frequency power supply is set to a predetermined time that is capable of interrupting the continuation of discharge.

2. The power supply unit for wire electrical discharge machining according to claim 1, further comprising: a controller in which a period of time during which the ac high-frequency voltage is applied by said ac high-frequency power supply and a pause time thereof as well as machining characteristics based on a peak value and a frequency of the ac high-frequency voltage and the like are stored in advance, and the stored values of the period of time during which the ac high-frequency voltage is applied and the pause time are invoked in accordance with one or more required specifications for machining the workpiece and machining conditions so as to control said ac high-frequency power supply.

3. The power supply unit for wire electrical discharge machining according to claim 1, wherein a time of application of the ac high-frequency voltage by said ac high-frequency power supply is set to approximately 1 $\mu$s or less.

4. The power supply unit for wire electrical discharge machining according to claim 1, wherein a period of time during which the ac high-frequency voltage is applied by said ac high-frequency power supply is set to not more than about 10 cycles of the ac high-frequency voltage.

5. A power supply unit for wire electrical discharge machining comprising an ac high-frequency power supply for applying an ac high-frequency voltage between a wire electrode and a workpiece by making smaller at a predetermined ratio an absolute value of the ac high-frequency voltage in a second predetermined time than an absolute value of the ac high-frequency voltage in a first predetermined time, and which repeatedly supplies the variable voltage,
   wherein the first period of time during which the ac high-frequency voltage is applied by said ac high-frequency power supply is set to a predetermined time which is capable of interrupting the continuation of discharge.

6. The power supply unit for wire electrical discharge machining according to claim 5, wherein the first period of time during which the ac high-frequency voltage is applied by said ac high-frequency power supply is set to not more than about 10 cycles of the ac high-frequency voltage.

7. The power supply unit for wire electrical discharge machining according to claim 5, comprising:
   a controller in which the first predetermined period of time and the second predetermined time as well as machining characteristics based on a peak value and a frequency of the ac high-frequency voltage and the like are stored in advance, and the stored values of the first predetermined time and the second predetermined time are invoked in accordance with one or more required specifications for machining the workpiece and machining conditions so as to control said ac high-frequency power supply.

8. The power supply unit for wire electrical discharge machining according to claim 5, wherein the first period of time during which the ac high-frequency voltage is applied by said ac high-frequency power supply is set to approximately 1 $\mu$s or less.

9. A method of wire electrical discharge machining for machining a workpiece by supplying an ac high-frequency voltage between a wire electrode and the workpiece, wherein the ac high-frequency voltage is applied between the electrode and the workpiece by making smaller at a predetermined ratio an absolute value of the ac high-frequency voltage in a second predetermined time than an absolute value of the ac high-frequency voltage in a first predetermined time, and the variable voltage is repeatedly applied wherein the first period of time during which the ac high-frequency voltage is applied by said ac high-frequency power supply is set to a predetermined time which is capable of interrupting the continuation of discharge.

10. The method of wire electrical discharge machining according to claim 9, wherein the first predetermined time and the second predetermined time are set in accordance with one or more required specifications for machining the workpiece and machining conditions.

11. A method of wire electrical discharge machining for machining a workpiece by supplying an ac high-frequency voltage between a wire electrode and the workpiece, wherein:

the ac high-frequency voltage is intermittently applied between the wire electrode and the workpiece to machine the workpiece, and a period of time during which the ac high-frequency voltage is applied is set to a predetermined time that is capable of interrupting the continuation of discharge.

12. The method of wire electrical discharge machining according to claim 11, wherein the period of time during which the ac high-frequency voltage is applied and a pause time thereof are set in accordance with one or more required specifications for machining the workpiece and machining conditions.

* * * * *